US009888480B2

(12) United States Patent
Kim et al.

(10) Patent No.: US 9,888,480 B2
(45) Date of Patent: Feb. 6, 2018

(54) METHOD FOR IDENTIFYING INTERFERENCE OF USER EQUIPMENT IN WIRELESS COMMUNICATION SYSTEM AND DEVICE THEREFOR

(71) Applicant: LG ELECTRONICS INC., Seoul (KR)

(72) Inventors: Eunsun Kim, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 14/438,071

(22) PCT Filed: Sep. 3, 2013

(86) PCT No.: PCT/KR2013/007927
§ 371 (c)(1),
(2) Date: Apr. 23, 2015

(87) PCT Pub. No.: WO2014/069781
PCT Pub. Date: May 8, 2014

(65) Prior Publication Data
US 2015/0296525 A1 Oct. 15, 2015

Related U.S. Application Data

(60) Provisional application No. 61/721,474, filed on Nov. 1, 2012.

(51) Int. Cl.
*H04W 72/08* (2009.01)
*H04W 16/32* (2009.01)
(Continued)

(52) U.S. Cl.
CPC ........ *H04W 72/082* (2013.01); *H04B 17/318* (2015.01); *H04W 16/10* (2013.01);
(Continued)

(58) Field of Classification Search
CPC ............. H04W 52/243; H04W 52/244; H04W 52/245; H04W 52/325; H04W 52/36; H04W 52/362
See application file for complete search history.

(56) References Cited

U.S. PATENT DOCUMENTS

2010/0035647 A1* 2/2010 Gholmieh ........... H04W 52/244
455/522
2011/0188427 A1* 8/2011 Ishii .................... H04W 52/367
370/311

(Continued)

FOREIGN PATENT DOCUMENTS

WO 2011/139043 11/2011

OTHER PUBLICATIONS

Kyocera Corp, "Carrier-based HetNet ICIC," 3GPP TSG-RAN WG3 #75, R3-120235, Feb. 2012, 6 pages.

(Continued)

*Primary Examiner* — Pao Sinkantarakorn
(74) *Attorney, Agent, or Firm* — Lee Hong Degerman Kang & Waimey (57) ABSTRACT

One embodiment of the present invention discloses a method for identifying the interference of a user equipment (s) on a pico base station located within the coverage of a macro base station in a wireless communication system, and the method comprises the steps: enabling the macro base station to receive an uplink (UL) interference control request message from the pico base station; signaling a random access preamble for the UL interference control to each of a plurality of interference candidate user equipments served by the macro base station; receiving, from the pico base station, received signal strength information of the random access preamble transmitted by the plurality of interference candidate user equipments; and determining the interference of user equipment on the pico base station on the basis of the (Continued)

received signal strength information, wherein transmission power of the random access preamble can be set in a random access preamble-specific manner.

15 Claims, 7 Drawing Sheets (51) Int. Cl.
  *H04W 16/10* (2009.01)
  *H04W 52/24* (2009.01)
  *H04W 72/04* (2009.01)
  *H04W 88/08* (2009.01)
  *H04W 52/32* (2009.01)
  *H04W 52/50* (2009.01)
  *H04B 17/318* (2015.01)
  *H04W 74/00* (2009.01)
  *H04W 52/36* (2009.01)
  *H04W 84/04* (2009.01)

(52) U.S. Cl.
  CPC ......... *H04W 16/32* (2013.01); *H04W 52/244* (2013.01); *H04W 52/325* (2013.01); *H04W 52/50* (2013.01); *H04W 72/0413* (2013.01); *H04W 72/0473* (2013.01); *H04W 88/08* (2013.01); *H04W 52/245* (2013.01); *H04W 52/362* (2013.01); *H04W 74/008* (2013.01); *H04W 84/045* (2013.01)

(56) References Cited

U.S. PATENT DOCUMENTS

2012/0258724 A1   10/2012  Kim et al.
2014/0226630 A1*  8/2014  Comstock ............. H04W 16/14
                                                          370/331

OTHER PUBLICATIONS

Kyocera Corp, "Preamble-based solution for CA_HetNet_ICIC macro-pico UL interference scenario," 3GPP TSG-RAN WG3 #75bis, R3-120663, Mar. 2012, 13 pages.
Kyocera Corp, et al., "Preamble-based solution for CA_HetNet_ ICIC Macro-Pico UL interference scenario," 3GPP TSG-RAN WG3 #76, R3-121189, May 2012, 5 pages.
PCT International Application No. PCT/KR2013/007927, Written Opinion of the International Searching Authority dated Dec. 31, 2013, 23 pages, Sep. 20, 2016.

* cited by examiner

(a) Control-plane protocol stack (b) User-plane protocol stack

METHOD FOR IDENTIFYING INTERFERENCE OF USER EQUIPMENT IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2013/007927, filed on Sep. 3, 2013, which claims the benefit of U.S. Provisional Application No. 61/721,474, filed on Nov. 1, 2012, the contents of which are all hereby incorporated by reference herein in their entirety.

TECHNICAL FIELD

The present invention relates to a method and apparatus for identifying an interfering User Equipment (UE) in a wireless communication system.

BACKGROUND ART

A brief description will be given of a 3rd Generation Partnership Project Long Term Evolution (3GPP LTE) system as an example of a wireless communication system to which the present invention can be applied.

Figure 1:
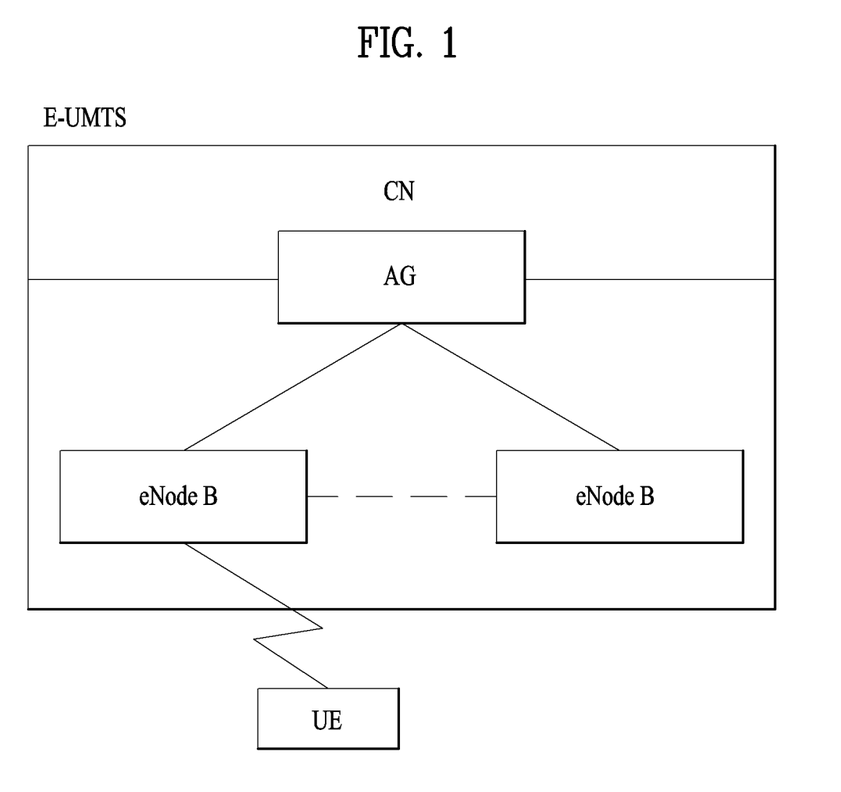
FIG. 1 illustrates physical channels and a general signal transmission method using the physical channels in a $3^{rd}$ Generation Partnership Project Longer Term Evolution (3GPP LTE) system as an exemplary wireless communication system.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on standardization of E-UMTS. E-UMTS is also called an LTE system. For details of the technical specifications of UMTS and E-UMTS, refer to "3rd Generation Partnership Project; Technical Specification Group Radio Access Network" Release 7 and Release 8, respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectations of users and service providers are increasing. Considering that other radio access technologies are under development, new technological evolutions are required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the conventional problem is to provide a method for identifying an interfering User Equipment (UE).

Another object of the present invention is to identify a UE that interferes with a pico Base Station (BS) (or other small BSs) within the coverage of a macro BS.

Another object of the present invention is to provide a method for using a random access procedure to identify an interfering UE.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for identifying a User Equipment(s) (UE(s)) interfering with a pico Base Station (BS) located within the coverage of a macro BS in a wireless communication system includes receiving, by the macro BS, an UpLink (UL) interference control request message from the pico BS and signaling a random access preamble for UL interference control to each of a plurality of candidate interfering UEs served by the macro BS and receiving from the pico BS information about received signal strength of the random access preambles transmitted by the plurality of candidate interfering UEs and determining a UE(s) causing UL interference to the pico BS based on the information about received signal strength. Transmission power of each of the random access preambles may be set specifically to the random access preamble.

Preferably, a maximum transmission number for each of the random access preambles may be set specifically to the random access preamble.

Preferably, the transmission power of each of the random access preambles may be fixed.

Preferably, a power ramping step (powerRampingStep) for each of the random access preambles may be set specifically to the random access preamble.

Preferably, the random access preambles may be shared between the macro BS and the pico BS in advance.

Preferably, the method may further include, after transmitting random access responses in response to the random access preambles, receiving information about transmission power of a last random access preamble used last by each of the plurality of candidate interfering UEs from the plurality of candidate interfering UEs.

Preferably, the method may further include transmitting the information about transmission power of the random access preamble used last by each of the plurality of candidate interfering UEs to the pico BS.

Preferably, the method may further include receiving from the pico BS information about received signal strength of the random access preamble, which corresponds to the transmission power of the random access preamble used last by each of the plurality of candidate interfering UEs.

In another aspect of the present invention, a method for identifying a UE(s) interfering with a pico BS located within the coverage of a macro BS in a wireless communication system includes transmitting, by the pico BS, a UL interference control request message to the macro BS, detecting random access preambles transmitted by a plurality of candidate interfering UEs according to a random access procedure for UL interference control triggered by the UL interference control request message and received signal strength of the random access preambles, and transmitting information about the detected received signal strength of the random access preambles to the macro BS. Transmission power of each of the random access preambles may be set specifically to the random access preamble.

Preferably, a maximum transmission number of each of the random access preambles may be set specifically to the random access preamble.

Preferably, the transmission power of each of the random access preambles may be fixed.

Preferably, a power ramping step (powerRampingStep) for each of the random access preambles may be set specifically to the random access preamble.

Preferably, the random access preambles may be shared between the macro BS and the pico BS in advance.

Preferably, the method may further include receiving from the macro BS information about transmission power of a random access preamble used last by each of the plurality of candidate interfering UEs.

Preferably, the method may further include transmitting to the macro BS information about a received signal strength of the random access preamble, which corresponds to transmission power of the random access preamble used last by each of the plurality of candidate interfering UEs.

In another aspect of the present invention, a macro BS for identifying a UE(s) interfering with a pico BS located within the coverage of the macro BS in a wireless communication system includes a Radio Frequency (RF) unit, and a processor configured to control the RF unit. The processor is configured to receive a UL interference control request message from the pico BS and signaling a random access preamble for UL interference control to each of a plurality of candidate interfering UEs served by the macro BS, to receive from the pico BS information about received signal strengths of the random access preambles transmitted by the plurality of candidate interfering UEs, and to determine a UE(s) causing UL interference to the pico BS based on the information about received signal strength. Transmission power of each of the random access preambles may be set specifically to the random access preamble.

In another aspect of the present invention, a pico BS located within the coverage of a macro BS, for identifying a UE(s) interfering with the pico BS in a wireless communication system includes an RF unit and a processor configured to control the RF unit. The processor is configured to transmit a UL interference control request message to the macro BS, to detect random access preambles transmitted by a plurality of candidate interfering UEs according to a random access procedure for UL interference control triggered by the UL interference control request message and received signal strength of the random access preambles, and to transmit information about the detected received signal strength of the random access preambles to the macro BS. Transmission power of each of the random access preambles may be set specifically to the random access preamble.

The above technical solutions are merely a part of embodiments of the present invention. Thus, those skilled in the art will derive and understand various embodiments reflecting the technical features of the present invention from the following detailed description of the present invention.

Advantageous Effects

According to an embodiment of the present invention, interference can be efficiently controlled by identifying an interfering User Equipment (UE).

According to an embodiment of the present invention, interference can be controlled compatibly with current standards by using an existing random access procedure.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Techniques as set forth below are applicable to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications/General Packet Radio Service/Enhanced Data Rates for GSM Evolution (GSM/GPRS/EDGE). OFDMA may be implemented as a radio technology such as Institute of Electrical and Electronics Engineers (IEEE) 802.11 (Wi-Fi), IEEE 802.16 (WiMAX), IEEE 802.20, Evolved-UTRA (E-UTRA) etc. UTRA is a part of Universal Mobile Telecommunication System (UMTS). 3rd Generation Partnership Project (3GPP) Long Term Evolution (LTE) is a part of Evolved UMTS (E-UMTS) using E-UTRA. The 3GPP LTE employs OFDMA for downlink and SC-FDMA for uplink. LTE-Advanced (LTE-A) is an evolution of the 3GPP LTE.

While embodiments of the present invention are described in the context of a 3GPP LTE/LTE-A system, they are purely exemplary. Therefore, the embodiments of the present invention are applicable to any other communication system as long as the above definitions are valid for the communication system. Specific terms used for the embodiments of the present invention are provided to help the understanding of the present invention. These specific terms may be replaced with other terms within the scope and spirit of the present invention.

In a wireless communication system, a User Equipment (UE) receives information from an evolved Node B (eNode B or eNB) on a Downlink (DL) and transmits information to the eNB on an Uplink (UL). Information transmitted and received between the eNB and the UE includes data and various types of control information and various physical channels exist depending on the types/usages of the transmitted and received information.

Figure 2:
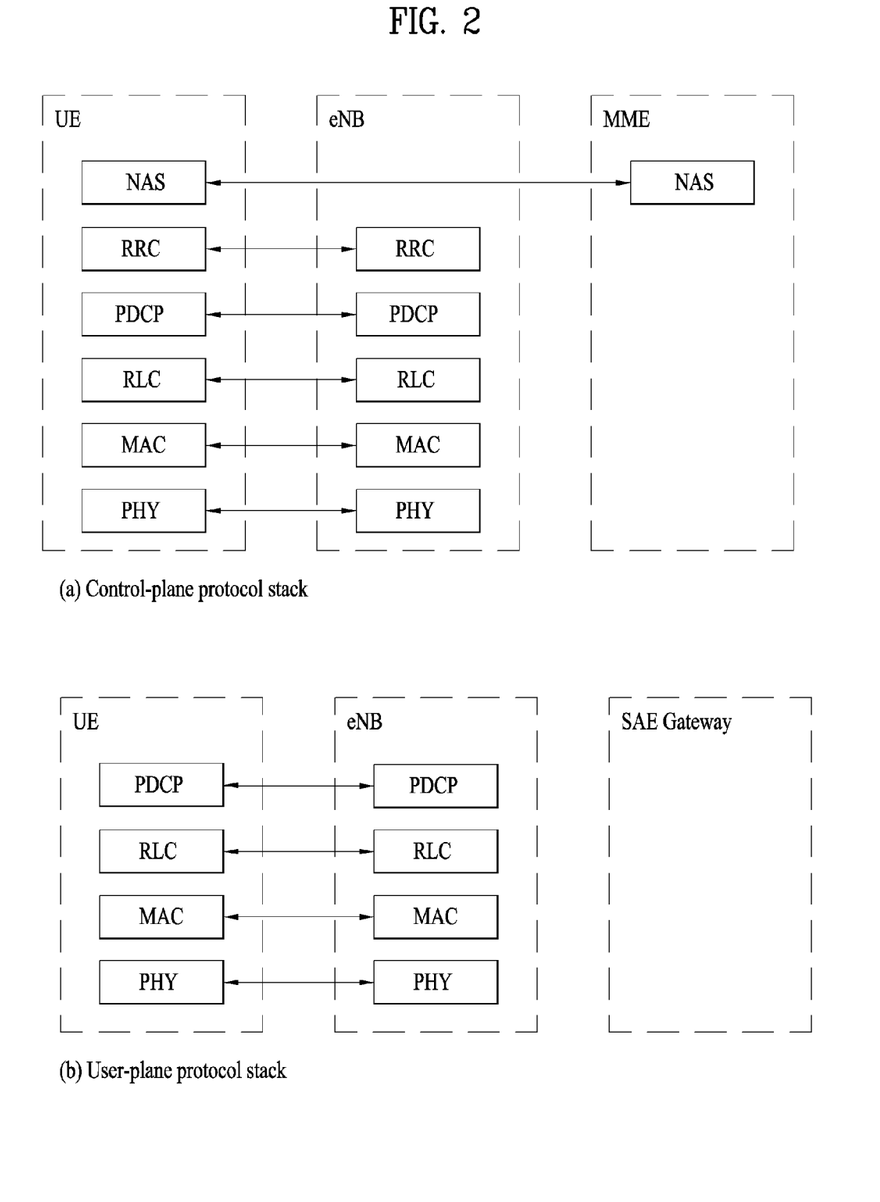
FIG. 2 illustrates a control-plane protocol stack and a user-plane protocol stack in a radio interface protocol architecture conforming to a 3GPP radio access network standard between a User Equipment (UE) and an Evolved UMTS Terrestrial Radio Access Network (E-UTRAN)

FIG. 2 illustrates control-plane and user-plane protocol stacks in a radio interface protocol architecture conforming to a 3GPP wireless access network standard between a UE and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in OFDMA for DL and in SC-FDMA for UL.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell managed by an eNB is set to one of bandwidths of 1.4, 3, 5, 10, 15, and 20 Mhz and provides a DL or UL service to a plurality of UEs. Different cells may be set to different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
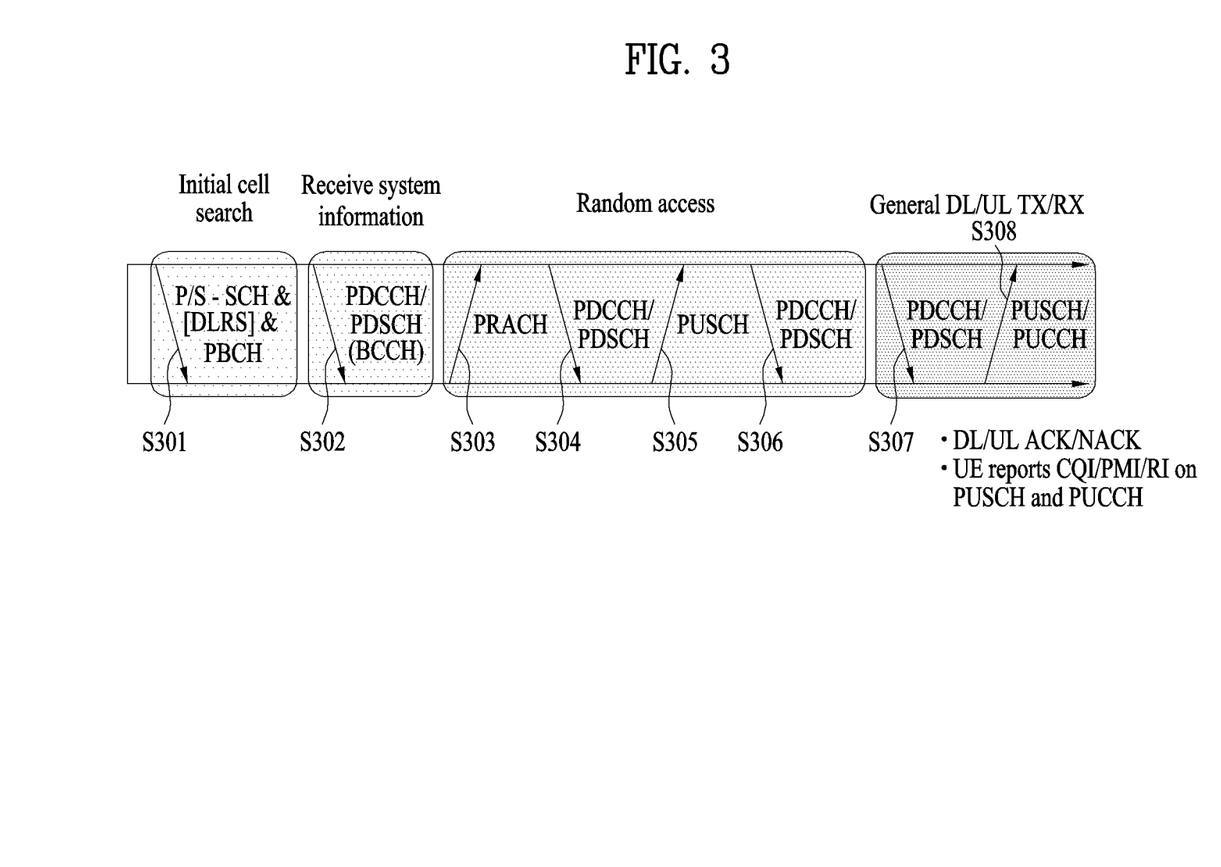
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search in step S301. The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH in step S302.

Subsequently, the UE may perform a random access procedure with the eNB in steps S303 to S306 to complete a connection to the eNB. In the random access procedure, the UE may transmit a preamble on a Physical Random Access Channel (PRACH) (S303) and may receive a response message to the preamble on a PDCCH and a PDSCH associated with the PDCCH (S304). In the case of contention-based random access, the UE may additionally perform a contention resolution procedure including transmission of an additional PRACH (S305) and reception of a PDCCH and a PDSCH associated with the PDCCH (S306).

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Control information that the UE transmits to the eNB on the UL is referred to as Uplink Control Information (UCI). The UCI includes a Hybrid Automatic Repeat and Request ACKnowledgment/Negative ACKnowledgment (HARQ ACK/NACK) signal, a Scheduling Request (SR), Channel State Information (CSI), etc. In the specification, an HARQ ACK/NACK is shortly called an HARQ-ACK or an ACK/NACK (A/N). The HARQ-ACK includes at least one of positive ACK (shortly, ACK), negative ACK (shortly, NACK), Discontinuous Transmission (DTX), and NACK/DTX. The CSI includes a Channel Quality Indicator (CQI), a Precoding Matrix Index (PMI), a Rank Indicator (RI), etc. While the UCI is transmitted generally on a PUCCH, it may be transmitted on a PUSCH in the case where control information and traffic data are to be transmitted simultaneously. Further, the UE may transmit the UCI aperiodically on the PUSCH, upon receipt of a request or command from the network.

Figure 4:
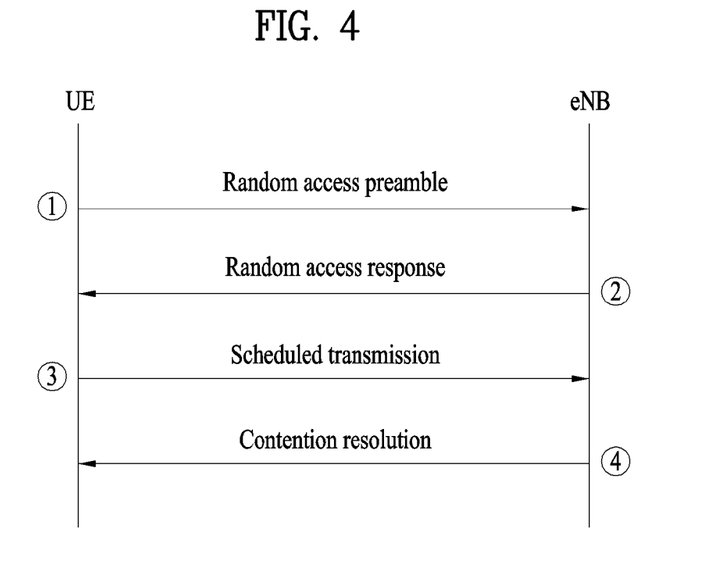
FIG. 4 illustrates a contention-based random access procedure as a random access procedure used in the 3GPP system.

FIG. 4 illustrates an operation between a UE and an eNB in a contention-based random access procedure.

In the contention-based random access procedure, the UE may randomly select a random access preamble from a group of random access preambles indicated by system information or a handover command, may select PRACH resources on which to transmit the random access preamble, and may transmit the selected random access preamble to the eNB (step 1).

The transmission power of the random access preamble is calculated by the following equation.

Transmission power of random access preamble=preambleInitialReceivedTargetPower+DELTA_PREAMBLE+(PREAMBLE_TRANSMISSION_COUNTER−1)*powerRampingStep   [Equation 1]

The transmission power of the random access preamble is based on an initially set transmission power value (preambleInitialReceivedTargetPower), a preamble format-based offset value (DELTA_PREAMBLE), and a transmission power increase value. The transmission power increase value is based on a transmission counter value (PREAMBLE_TRANSMISSION_COUNTER) and a power ramping step (powerRampingStep). As described later, each time a random access preamble is not received appropriately in response to the random access preamble or contention resolution is not processed successfully, the transmission counter value of the random access preamble is increased by 1. Thus, the transmission power of the random access preamble will be increased.

After transmitting the random access preamble, the UE may attempt to receive a response to the random access preamble within a random access preamble reception window indicated by the system information or the handover command (step 2). Specifically, random access information may be transmitted in a MAC PDU and the MAC PDU may be transmitted on a PDSCH. In addition, a PDCCH is transmitted so that the UE may receive information on the PDSCH appropriately. That is, the PDCCH delivers information about a UE to receive the PDSCH, time and frequency information about radio resources of the PDSCH, and information about a transport format of the PDSCH. Upon successful receipt of the PDCCH, the UE may receive a random access response on the PDSCH based on information of the PDCCH. The random access response may include an ID of a random access preamble, a UL Grant, a Temporary Cell Radio Network Temporary Identifier (C-RNTI), a Time Alignment Command (TAC), etc. The reason for including the ID of the random access preamble in the random access response is to indicate information to which the UL Grant, the Temporary C-RNTI, and the TAC are valid to the UE. The ID of the random access preamble is required because one random access preamble may include random access information for one or more UEs. The ID of the random access preamble may be identical to the ID of the random access preamble selected by the UE in step 1.

However, if the random access response has not been received, for example, if the random access response has not been received within the random access response reception window or the random access response does not include a random access preamble ID identifying the transmitted random access preamble, it is determined that the random access response has been failed. In this case, the UE should increase the random access preamble transmission counter value by 1. Then the UE compares the transmission counter value with a maximum transmission number set for the random access preamble. If both values are in a specific relationship, the UE may indicate to a higher layer that the random access procedure has a problem. Subsequently, the UE should return to step 1 and select the random access preamble and/or resources for the random access preamble. Accordingly, the transmission power of the random access preamble is continuously increased each time by the power ramping step along with the increase of the transmission counter value, until the random access response is received.

Upon receipt of the valid random access response, the UE may process the information included in the random access response. That is, the UE stores the Temporary C-RNTI. Further, the UE uses the UL Grant to transmit data stored in a buffer or new data to the eNB (step 3). Herein, an ID of the UE should be included in the data carried by the UL Grant. This is because the eNB cannot identify UEs performing the random access procedure and should identify the UEs later for contention procedure in the contention-based random access procedure. A UE ID may be included in a UL Grant in two methods. One of the methods is to transmit the cell ID of the UE in the UL grant in relation to whether the UE has already received the valid cell ID assigned to the cell of the UE before the random access procedure. The other method is to transmit a unique ID of the UE, if the UE has not received the valid cell ID before the random access procedure. In general, the unique ID of the UE is longer than the cell ID. If the UE transmits the data in the UL Grant in step 3, the UE starts a contention resolution timer.

After transmitting the data along with the ID in the UL grant included in the random access response, the UE awaits receipt of an indication for contention resolution from the eNB. That is, the UE attempts to receive a PDCCH in order to receive a specific message (step 4). The PDCCH may be received in two methods. As described before, if the UE ID transmitted in the UL Grant is the cell ID, the UE attempts to receive a PDCCH using the cell ID. If the UE ID transmitted in the UL Grant is the unique ID of the UE, the UE attempts to receive a PDCCH using the Temporary C-RNTI included in the random access preamble. In the former case, upon receipt of a PDCCH using the cell ID before expiration of the contention resolution timer, the UE completes the random access procedure, determining that the random access procedure is successful. In the latter case, upon receipt of a PDCCH using the Temporary C-RNTI before expiration of the contention resolution timer, the UE checks data received on a PDSCH indicated by the PDCCH. If the unique ID of the UE is included in the data, the UE completes the random access procedure, determining that the random access procedure is successful.

On the other hand, if the contention resolution is not processed successfully, the UE should perform an operation similar to the operation performed in the above case of failed reception of a random access response. That is, the UE should increase the random access preamble transmission counter value by 1. Then the UE compares the transmission counter value with the maximum transmission number set for the random access preamble. If both values are in a specific relationship, the UE may indicate to a higher layer that the random access procedure has a problem. Subsequently, the UE should return to step 1 and select the random access preamble and/or resources for the random access preamble.

As described before, the transmission power of the random access preamble is increased along with the increase of the transmission counter value in the contention-based random access procedure related to FIG. 4.

Figure 5:
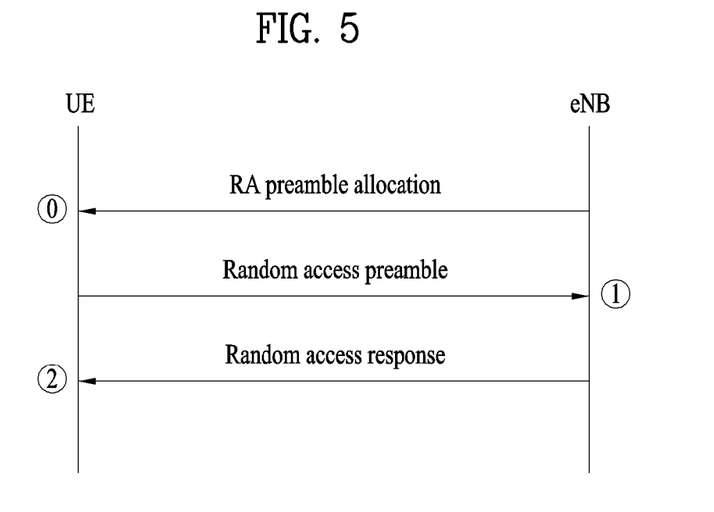
FIG. 5 illustrates a contention-free based random access procedure as a random access procedures used in the 3GPP system.

FIG. 5 illustrates an operation between an eNB and a UE in a contention-free random access procedure. Compared to the contention-based random access procedure, upon receipt of random access response information in response to a random access preamble, the UE completes the random access procedure, considering that the random access is successful in the contention-free random access procedure.

In general, the contention-free random access procedure is performed in two cases: handover and upon request of an eNB. The contention-based random access procedure may also be performed in these two cases. It is important for the UE to receive a dedicated random access preamble from the eNB without contention. A handover command and a PDCCH command may be generated to allocate the random access preamble. When the eNB allocates the dedicated random access preamble to the UE, the UE transmits the preamble to the eNB. Subsequently, random access response information is received in the same manner as in the contention-based random access procedure.

When the eNB commands the UE to start the contention-free random access procedure, the contention-free random access procedure is initiated. In this case, the eNB selects a specific preamble for use in the random access procedure and directly indicates the specific preamble to the UE. For example, if the eNB notifies the UE of 4 as the ID of the random access preamble (i.e., RAPID=4), the UE may perform the contention-free random access procedure using a specific preamble corresponding to RAPID=4.

In the contention-free random access procedure, the transmission power of a random access preamble is determined in the same manner as in the above-described contention-based random access procedure. Likewise in the contention-free random access procedure, if a random access response has not been received successfully, a transmission counter value is increased by 1 and compared with a maximum transmission number. Then, the UE returns to step 0 and performs the random access procedure.

Figure 6:
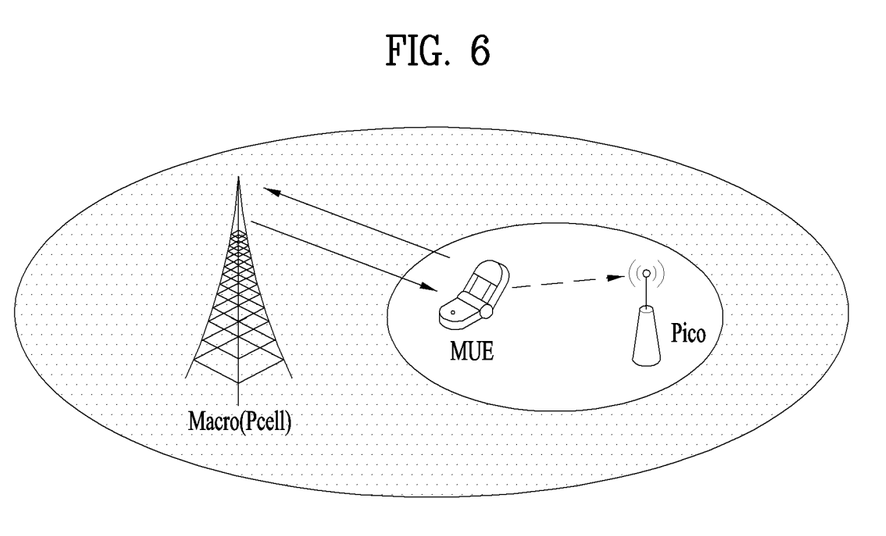
FIG. 6 illustrates a wireless communication environment related to an embodiment of the present invention.

FIG. 6 illustrates a wireless communication environment in which a UL signal of a UE served by a macro eNB interferes with a pico eNB neighboring to the UE according to an embodiment of the present invention. If the UE is not aware of the presence of the neighbor pico eNB and interferes with the neighbor pico eNB continuously, the present invention provides a method for solving this problem. Without knowledge of the presence of the neighbor pico eNB, the UE does not measure about the pico eNB at all.

A macro UE interfering with a pico eNB is referred to as an MUE. The pico eNB identifies the MUE and reports the MUE to a macro eNB. Upon receipt of the report, the macro eNB may take an appropriate action to prevent the MUE from severely interfering with the pico eNB. For example, if the macro eNB uses a plurality of carriers, the macro eNB may schedule a carrier other than a current carrier. Or when scheduling for the MUE, the macro eNB may schedule a carrier other than a carrier used by the pico eNB.

Figure 7:
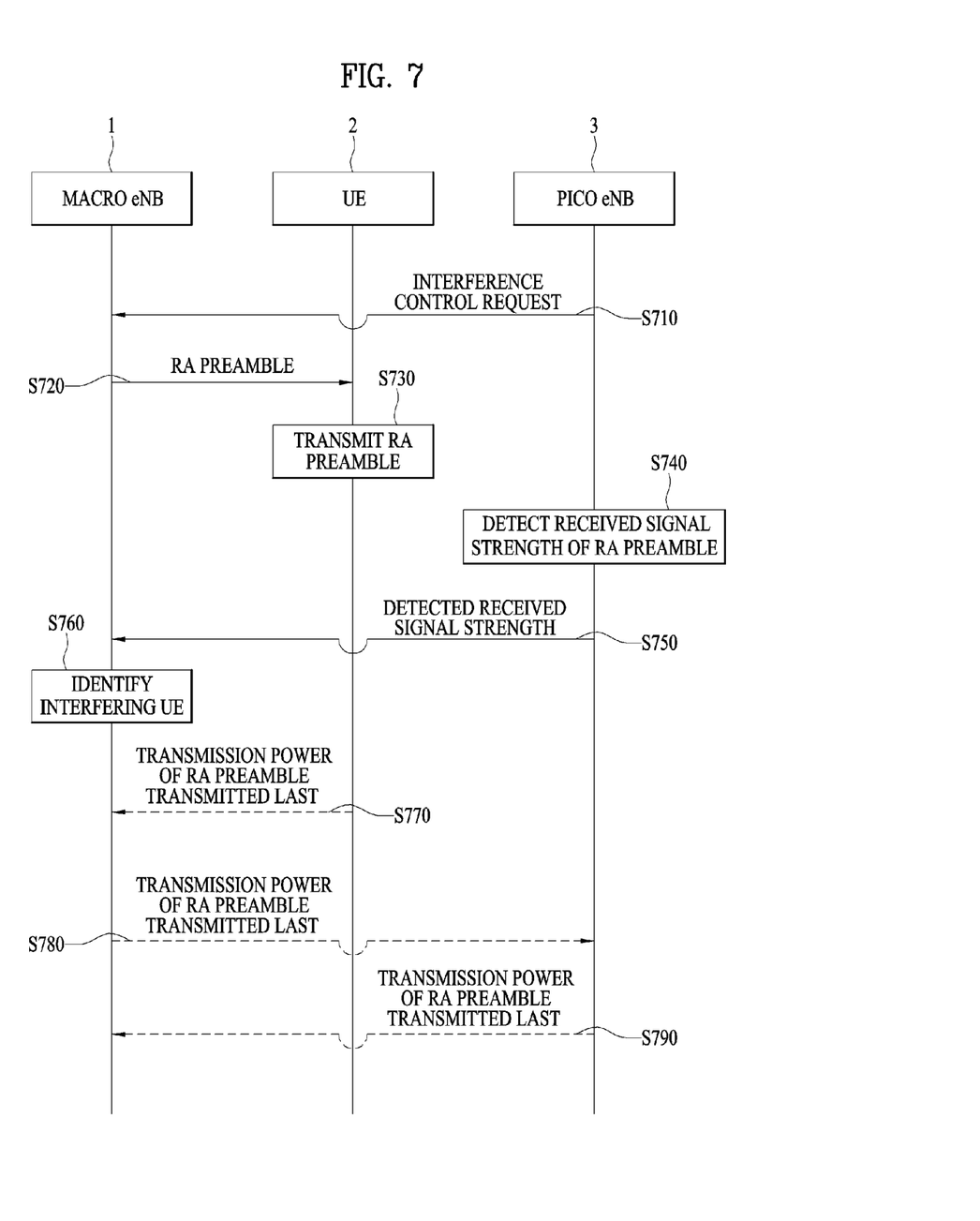
FIG. 7 illustrates an operation according to an embodiment of the present invention.

The present disclosure provides a method for detecting and identifying an interfering MUE by a pico eNB. FIG. 7 illustrates an embodiment of the present invention. A pico eNB 3 may transmit a signal requesting control of UL interference to it to a macro eNB 1 (S710). This signal may be overload information, interference level information, or a complaint signal. Upon receipt of the signal, the macro eNB 1 may select UEs that are likely to cause interference to the neighbor pico eNB 3 and instruct a selected UE 2 to perform the contention-free based random access procedure. A Random Access Channel (RACH) preamble and RACH resources used in the random access procedure for interference cancellation may be information known between the macro eNB and the pico eNB by information exchange. As described before, an RACH preamble and its resources are signaled explicitly to a UE and the UE performs a random access procedure using the signaled RACH preamble and the resources in the contention-free based random access procedure.

In the contention-free based random access procedure, the selected UE 2 may transmit an RACH preamble (S730). Although the UE 2 transmits the RACH preamble to the macro eNB 1 that has signaled the RACH preamble and the resources, the pico eNB 3 may also detect the received signal strength of the RACH preamble because it has knowledge of the RACH preamble and the resources. Therefore, the pico eNB 3 may detect the RACH preamble (S740) and may transmit related information along with the received signal strength of the RACH preamble to the macro eNB 1 (S750). The macro eNB may identify the MUE interfering with the pico eNB using the information (S760) and thus may take an appropriate action in regard to the MUE.

When transmitting an RACH preamble, the UE may determine the transmission power of a Physical RACH (PRACH) preamble based on a pathloss measured by the UE. Then, the UE transmits the PRACH preamble with the determined transmission power. If the random access procedure is not successful (for example, if a random access response has not been received or contention resolution has been failed), the UE may transmit the PRACH preamble by continuously ramping up the transmission power from an initial transmission power by a predetermined power value each time. If the number of transmissions of the PRACH preamble reaches a predetermined PRACH preamble transmission number (for example, a maximum number of preamble transmissions) or the UE receives a random access response from an eNB, the UE discontinues the transmission of the PRACH preamble.

On the other hand, in the case where an RACH preamble is transmitted for the purpose of identifying an MUE in the forgoing embodiment, if a plurality of MUEs continuously increase transmission power in transmitting PRACH preambles to be identified by a pico eNB, their PRACH preamble transmissions may cause more severe interference to the pico eNB. Accordingly, the present invention proposes that a macro eNB presets transmission power values for PRACH preambles of UEs. When UEs are supposed to transmit PRACH preambles so that the macro eNB may identify an interfering MUE, the macro eNB sets transmission power values for use in PRACH preamble transmissions of the UEs in information about the PRACH preambles transmitted to the UEs. Herein, the pico eNB may recommend transmission power values for PRACH preamble transmissions of the UEs to the macro eNB. Further, the UEs to which the transmission power values are indicated may transmit PRACH preambles with the indicated transmission power values a predetermined number of PRACH preamble transmission times without increasing transmission power.

In another embodiment, a different transmission power value may be set for a PRACH preamble according to the purpose of the PRACH preamble. That is, if an RACH preamble is transmitted for the purpose of interference coordination as proposed in the embodiment of the present invention, a transmission power value may be set separately for the RACH preamble. When an RACH preamble is used for the purpose of interference coordination, a UE transmits a PRACH preamble with the smaller between a predetermined transmission power for the PRACH preamble and a maximum transmission power allowed for the UE a predetermined number of PRACH preamble transmissions without further increasing the predetermined transmission power. In another method, the power ramping step of a specific PRACH preamble may be fixed to, for example, 1 (powerRampingStep=1 (0 dB)).

To extend the above principle, the power ramping step may be different for each PRACH preamble transmission purpose or each PRACH preamble. For example, if a macro eNB commands UEs to perform the contention-free based random access procedure for the purpose of interference coordination according to an embodiment of the present invention, the power ramping step may be set to be smaller than a power ramping step in other random access procedures (for example, a random access procedure serving a purpose other than interference coordination).

Further, it is proposed that a maximum PRACH preamble transmission number is set for a specific PRACH preamble. That is, a maximum transmission number, for example, preambleTransMax may be set for a specific PRACH preamble, to thereby reduce unnecessary interference. As described before, a UE discontinues PRACH preamble transmission only when it receives a random access response successfully. Although not a macro eNB but a pico eNB is supposed to detect a PRACH preamble transmitted by an MUE interfering with the pico eNB, the MUE discontinues the PRACH preamble transmission only when it receives a random access response from the macro eNB. Therefore, once the neighbor pico eNB detects PRACH preambles, UEs should be able to discontinue PRACH preamble transmissions despite non-reception of random access responses from the macro eNB. Accordingly, a maximum transmission number (preambleTransMax) is set for a specific PRACH preamble. To extend this principle, a different preambleTransMax may be set for each PRACH preamble transmission purpose. For example, PRACH preambles may be grouped and preambleTransMax may be set on a group basis.

In another example, the UE 2 may report the transmission power value of its PRACH preamble to the macro eNB 1, while transmitting the PRACH preamble (S760). It is assumed herein that the UE 2 continuously increases the transmission power, while transmitting the PRACH preamble. Considering that the UE starts to transmit the PRACH preamble with a low power value relative to real data transmission, even though the pico eNB detects the PRACH preamble transmitted by the UE, it is difficult to determine whether the UE interferes with the pico eNB. Therefore, after the UE 2 receives a random access response from the macro eNB 1 in response to the transmitted PRACH preamble, the UE 2 may report information about the transmission power of a last RACH preamble (that is, an RACH preamble corresponding to the random access response) to the eNB in response to the random access response.

For example, if a random access response message includes a field in which the macro eNB 1 requests PRACH preamble transmission power and the field is set, upon receipt of the random access response message, a UE may report the transmission power of its PRACH preamble. Upon receipt of the transmission power, the macro eNB 1 forwards the value to the pico eNB 3 (S770). The macro eNB and the pico eNB may determine information about power with which the UE transmits a signal, causing severe interference to the pico eNB 3, using the value. The pico eNB 3 may report an interference caused to the pico eNB 3 by the specific PRACH preamble, that is, a received signal value with respect to a power transmission power value of a specific PRACH preamble detected by the pico eNB 3 to the macro eNB 1 (S780).

Figure 8:
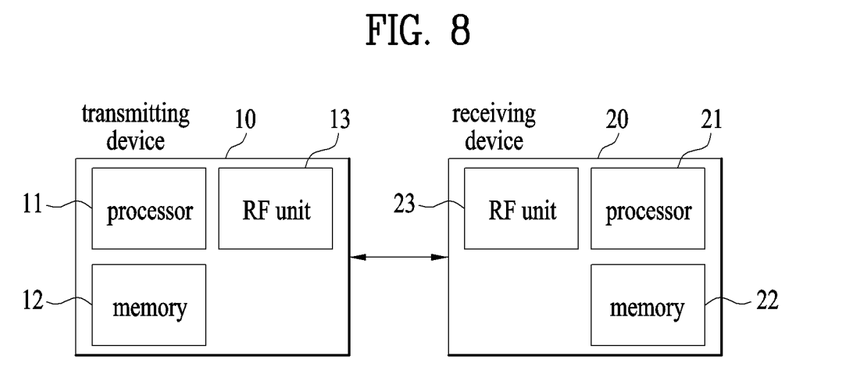
FIG. 8 is a block diagram of apparatuses for performing an embodiment(s) of the present invention.

FIG. 8 is a block diagram of a transmitting device 10 and a receiving device 20 configured to implement exemplary embodiments of the present invention. Referring to FIG. 8, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, a BS serves as the receiving device 20 on uplink and as the transmission device 10 on downlink.

Specific configurations of the UE or the BS functioning as the transmitting device and/or the receiving device may be implemented as a combination of one or more embodiments of the present invention described above in connection with the figures.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention is applicable to a terminal, a base station (BS), or other devices in wireless communication system.

The invention claimed is:

1. A method for identifying a User Equipment(s) (UE(s)) interfering with a pico Base Station (BS) located within the coverage of a macro BS in a wireless communication system, the method comprising:
   receiving, by the macro BS, an UpLink (UL) interference control request message from the pico BS;
   signaling a random access preamble for UL interference control to each of a plurality of candidate interfering UEs served by the macro BS;
   transmitting information about the random access preamble to each of the plurality of candidate interfering UEs, the information including transmission power to be used for the plurality of candidate interfering UEs to transmit each of the random access preambles;
   receiving from the pico BS information about received signal strength of the random access preambles transmitted by the plurality of candidate interfering UEs, and
   determining a UE(s) causing UL interference to the pico BS based on the information about received signal strength, and
   after transmitting random access responses in response to the random access preambles, receiving information about transmission power of a random access preamble used last by each of the plurality of candidate interfering UEs from the plurality of candidate interfering UEs;
   wherein the transmission power is set specifically to a respective one of the random access preambles.

2. The method according to claim 1, wherein a maximum transmission number for each of the random access preambles is set specifically to a respective one of the random access preambles.

3. The method according to claim 1, wherein the transmission power of each of the random access preambles is fixed.

4. The method according to claim 1, wherein a power ramping step (powerRampingStep) for each of the random access preambles is set specifically to a respective one of the random access preambles.

5. The method according to claim 1, wherein the random access preambles are shared between the macro BS and the pico BS in advance.

6. The method according to claim 1, further comprising: transmitting the information about transmission power of the random access preamble used last by each of the plurality of the candidate interfering UEs to the pico BS.

7. The method according to claim 6, further comprising: receiving from the pico BS information about received signal strength of the random access preamble, which corresponds to the transmission power of the random access preamble used last by each of the plurality the candidate interfering UEs.

8. A method for identifying a User Equipment(s) (UE(s)) interfering with a pico Base Station (BS) located within the coverage of a macro BS in a wireless communication system, the method comprising:
   transmitting, by the pico BS, an UpLink (UL) interference control request message to the macro BS, detecting random access preambles transmitted by a plurality of candidate interfering UEs according to a random access procedure for UL interference control triggered by the UL interference control request message and received signal strength of the random access preambles, transmitting information about the detected received signal strength of the random access preambles to the macro BS, and receiving from the macro BS information about transmission power of a random access preamble used last by each of the plurality of candidate interfering UEs, wherein transmission power is set specifically to a respective one of the random access preambles, and wherein transmission power to transmit each of the random access preambles is transmitted by the macro BS to each of a plurality of candidate interfering UEs.

9. The method according to claim 8, wherein a maximum transmission number of each of the random access preambles is set specifically to a respective one of the random access preambles.

10. The method according to claim 8, wherein the transmission power of each of the random access preambles is fixed.

11. The method according to claim 8, wherein a power ramping step (powerRampingStep) for each of the random access preambles is set specifically to a respective one of the random access preambles.

12. The method according to claim 8, wherein the random access preambles are shared between the macro BS and the pico BS in advance.

13. The method according to claim 8, further comprising transmitting to the macro BS information about received signal strength of the random access preamble, which corresponds to transmission power of the random access preamble used last by each of the plurality of candidate interfering UEs.

14. A macro Base Station (BS) for identifying a User Equipment(s) (UE(s)) interfering with a pico BS located within the coverage of the macro BS in a wireless communication system, the macro BS comprising:

a Radio Frequency (RF) unit; and a processor controls the RF unit, wherein the processor is receives an UpLink (UL) interference control request message from the pico BS, signals a random access preamble for UL interference control to each of a plurality of candidate interfering UEs served by the macro BS, transmits information about the random access preamble to each of the plurality of candidate interfering UEs, the information including transmission power to be used for the plurality of candidate interfering UEs to transmit each of the random access preambles, receives from the pico BS information about received signal strengths of the random access preambles transmitted by the plurality of candidate interfering UEs, determines a UE(s) causing UL interference to the pico BS based on the information about received signal strength, and after transmitting random access responses in response to the random access preambles, receives information about transmission power of a random access preamble used last by each of the plurality of candidate interfering UEs from the plurality of candidate interfering UEs, and wherein the transmission power is set specifically to a respective one of the random access preambles.

15. A pico Base Station (BS) located within the coverage of a macro BS, for identifying a User Equipment(s) (UE(s)) interfering with the pico BS in a wireless communication system, the pico BS comprising:

a Radio Frequency (RF) unit; and a processor controls the RF unit, wherein the processor transmits an UpLink (UL) interference control request message to the macro BS, detects random access preambles transmitted by a plurality of candidate interfering UEs according to a random access procedure for UL interference control triggered by the UL interference control request message and received signal strength of the random access preambles, transmits information about the detected received signal strength of the random access preambles to the macro BS, and receives from the macro BS information about transmission power of a random access preamble used last by each of the plurality of candidate interfering UEs, and wherein transmission power is set specifically to a respective one of the random access preambles, and wherein transmission power to transmit each of the random access preambles is transmitted by the macro BS to each of a plurality of candidate interfering UEs.

* * * * *